United States Patent [19]
Melead

[11] 3,829,274
[45] Aug. 13, 1974

[54] INTERCHANGEABLE DIE LIPS FOR EXTRUSION DIE AND INDEPENDENTLY ADJUSTABLE DECKLES THEREFOR

[75] Inventor: James J. Melead, Roscoe, Ill.

[73] Assignee: Beloit Corporation, Beloit, Wis.

[22] Filed: Oct. 19, 1972

[21] Appl. No.: 299,044

[52] U.S. Cl.............................. 425/466, 425/381
[51] Int. Cl............................................. B29d 7/04
[58] Field of Search ........... 425/381, 466, 467, 440, 425/378, 463, 382

[56] References Cited
UNITED STATES PATENTS

| | | | |
|---|---|---|---|
| 3,096,543 | 7/1963 | Konopacke et al................. | 425/466 |
| 3,267,519 | 8/1966 | Albert.................................. | 425/466 |
| 3,293,689 | 12/1966 | Chiselko et al...................... | 425/466 |
| 3,711,235 | 1/1973 | Bunte et al.......................... | 425/466 |

Primary Examiner—R. Spencer Annear
Assistant Examiner—Mark Rosenbaum
Attorney, Agent, or Firm—Hill, Gross, Simpson, Van Santen, Chiara & Simpson

[57] ABSTRACT

Film extrusion die in the form of an elongated die body, which may be split and divided by a divider plate and have a pair of spaced extrusion orifaces on opposite sides of the divider plate detachably secured to the die body. The divider plate may be removed to provide a single extrusion orifice die, if desired. An inlet for the hot thermoplastic material enters each die half. A manifold chamber in each die half communicates with an associated inlet and leads to a melt flow passageway leading along a wall of the divider. Adjustable die lips define the orifices for the die, and have spaced lands for internal deckles, controlling the edge of the film. A deckle boat supported on the die lips carries spaced deckle seals having sealing engagement with the bottoms of the orifices. An adjustment means is provided for adjusting the external and internal deckles as a unit. The internal deckles may be adjustably moved relative to each other and relative to the external deckle to disrupt the edge of the molten plastic and minimize edge bead. The die lips may be in a package of different forms, best suited to the particular type of plastic being extruded and are all adjustable and interchangeable.

19 Claims, 6 Drawing Figures

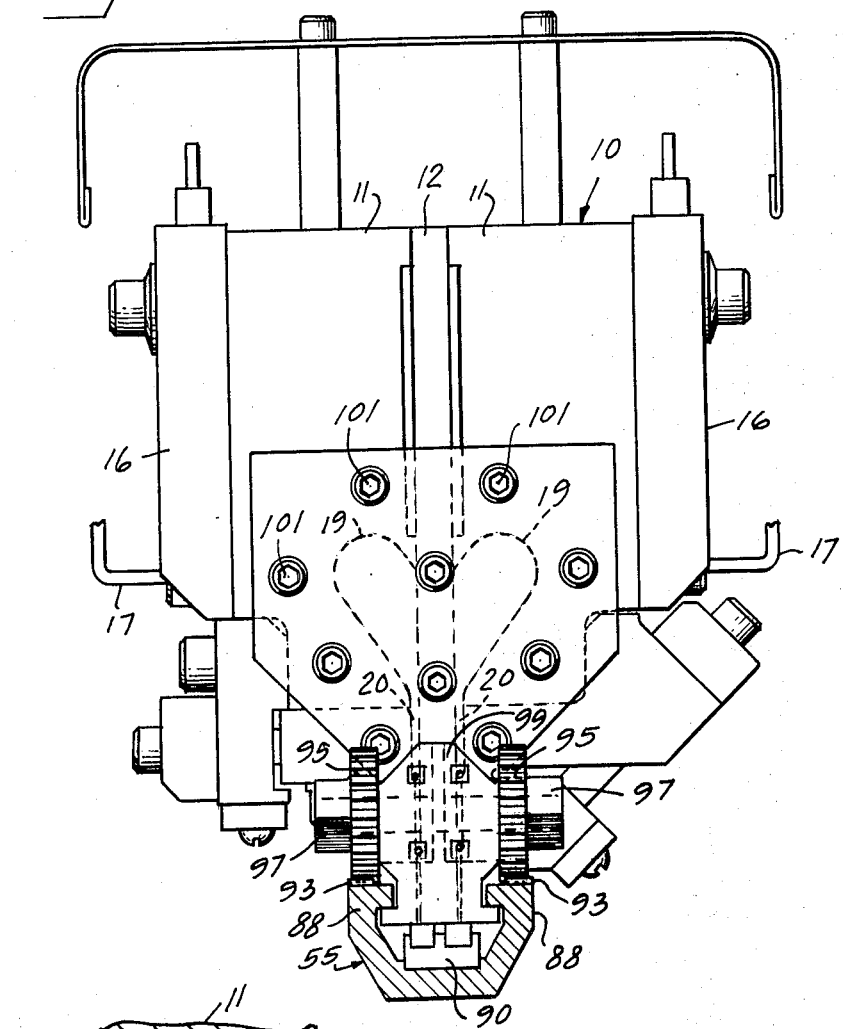
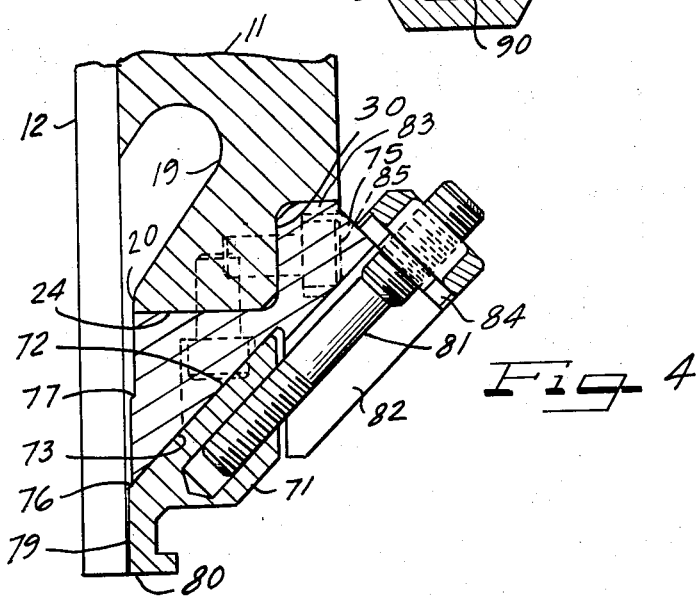

INTERCHANGEABLE DIE LIPS FOR EXTRUSION DIE AND INDEPENDENTLY ADJUSTABLE DECKLES THEREFOR

BACKGROUND AND ADVANTAGES OF THE INVENTION

Film extrusion dies having adjustable deckles defining the width of the film are shown in the patents to Chiselko et al. U.S. Pat. No. 3,293,689; Hoffman U.S. Pat. No. 3,238,563; and Groleau U.S. Pat. No. 2,982,995 and in a copending application of George J. Marion, Ser. No. 223,436, filed as a continuation-in-part of application Ser. No. 861,047 and assigned to the assignee of the present invention. In the three patents mentioned, the die is a single orifice die. U.S. Pat. Nos. 3,293,689 and 3,238,563 each have a deckle boat slidably supported on die lips and have rack and pinion or cylinder and piston means for adjustably moving the deckle boat. In Chiselko and Hoffman, individual dies are required when it is desired to co-extrude flat multilayer films, which add to the complication of the extruding operation and do not have the advantages of a split die with side-by-side flow passageways and discharge orifices, nor do they have the advantage of controlling edge beading by internal deckles, which may be positioned independently of positioning of the external deckle boat and be offset from each other in a vertical plane to disrupt the edge of the molten plastic, where required to minimize edge bead.

The patent to Groleau U.S. Pat. No. 2,982,995 shows an internal deckle which may be manually adjusted by pushing or pulling the deckle, but besides not having the advantage of the deckle boat, has no provision for converting the die from a single to double orifice die, nor does it have the interchangeable die lips for obtaining optimum performance of the resin as extruded through a die slot.

The present invention is further an improvement on the die of application Ser. No. 223,436, showing a dual orifice die and split die body. In this die, however, the die lips are an integral part of the die body and cannot be replaced when worn or interchanged with other die lips to give optimum results for a particular resin extruded nor does this structure utilize internal deckles adjustable independently of each other and independently of the external deckle.

This invention, therefore, provides an apparatus particularly adapted for the extrusion or co-extrusion of flat film of thermoplastic materials, such as thermoplastic resins, waxes, hot melt adhesives, etc. in a molten state into a single or composite film that is ready for use as such or is bonded to another substrate in which the width of the film is determined and edge build up is eliminated by the use of internal and external deckles in which the internal deckles may be adjustably moved together or independently of each other and of adjustment of the external deckle.

The die of the present invention further is an improvement on and a distinct advantage over the dies of the foregoing patents and applications, in that the die lips may be interchangeably mounted on the die body and may be of various types, which will enable the best lip to be used for either orifice of the die to obtain optimum performance of the resin in the slot as extruded, and the internal and external deckles may be adjusted together and the internal deckles may be adjusted independently of each other in both horizontal and vertical directions in a simple and expeditious manner and completely eliminate edge bead.

A further advantage of the present invention is that various die lips may be provided in a package to accommodate the use of various conceivable designs of die lips without altering the die body proper.

A further advantage in the invention is that the versatility and flexibility of the die is increased by a simple die arrangement and interchangeable package of die lips which may be adjusted to suit the particular film extruded and to attain optimum results of a particular resin extruded through the die slot and orifice.

Another advantage of the invention is that the die lips defining the outer wall of the flow passageway and orifices of the dies have been formed with lands cooperating witn internal deckles and form a slide for an external deckle boat, and the internal deckles may be adjusted independently of each other, or together, relative to or with the external deckle as conditions require.

Other objects, features and advantages of the invention will be readily apparent from the following desciption of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 3 is an end view of the die shown in FIGS. 1 and 2 with certain parts broken away and certain other parts shown in vertical section.

FIG. 4 is a view showing a modified form of adjustable die lip that may be used in place of the die lips shown in FIG. 2.

DESCRIPTION OF PREFERRED EMBODIMENT OF THE INVENTION

Figure 1:
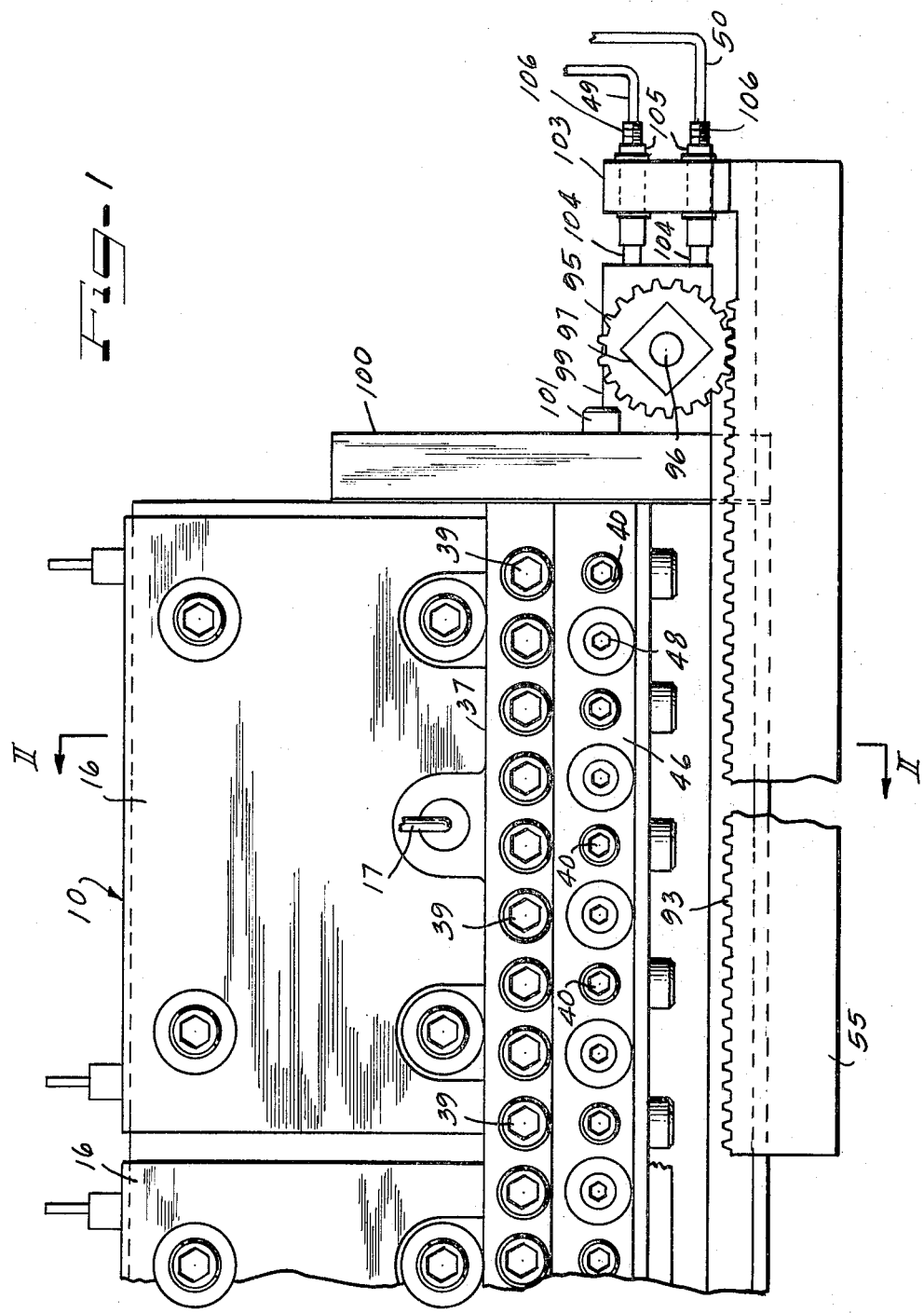
FIG. 1 is a fragmentary view in side elevation of an extrusion die constructed in accordance with the principles of the present invention.

In FIGS. 1, 2, 3, 5 and 6 of the drawings, I have shown a split die body 10 including two die halves 11 divided by a spacer 12 and secured together into a single die body as by cap screws 13 recessed in said die body and spaced therealong. Each die half 11 is of a construction similar to that of the other and has recesses 15 for the cap screws 13 alternately arranged along the die halves so one cap screw may be threaded from one side of the die body and the other cap screw may be threaded from the opposite side of the die body to uniformly mate the die bodies along the divider 12, or along each other where the die is used for extruding a single film of thermoplastic material. Heaters 16 which may be resistor heaters of a conventional form are spaced along each side of the die body and are controlled by thermocouples 17 to maintain the temperature of the die body at a selected temperature and thereby maintain the thermoplastic material in the proper melt flow state in manifold chambers 19 within said die body.

The manifold chambers 19, when the die is assembled, are shown as being aligned on opposite sides of the divider 12 and when taken together may be of a generally heart-shaped formation, tapering at their lower ends into melt flow passageways 20 extending along opposite sides of the divider 12. The melt flow passageways 20 lead from the tapered ends of the manifold chambers 19 into passageways 21 formed between die lips 22 and 23 and opposite sides of the divider 12. While the manifold chambers 19 are shown as being of a heart-shaped formation, they need not necessarily be of such a form, but may be of various other suitable forms, which may be selected for the particular type of thermoplastic material extruded or other conditions, to give the most efficient performance.

THe die lips 22 and 23 extend along and depend from a flat bottom 24 in each die half 11. A hot melt inlet 25 for thermoplastic material to be extruded leads into the top of one die half 11 and supplies flowable plastic material 26 to one manifold chamber 19. A similar hot melt inlet 27 leads into the opposite die half 11 and has communication with a passageway 29 supplying hot melt thermoplastic material to the associated manifold chamber 19.

The die 10 is herein shown as oriented in a vertical direction as in the drawings, with the inlets leading into the tops of the die halves and the outlets leading from the bottoms of the die halves. The die will be described in this orientation herein, although it need not be so oriented and may be oriented in any suitable position particularly where the thermoplastic material is injected under pressure.

Figure 2:
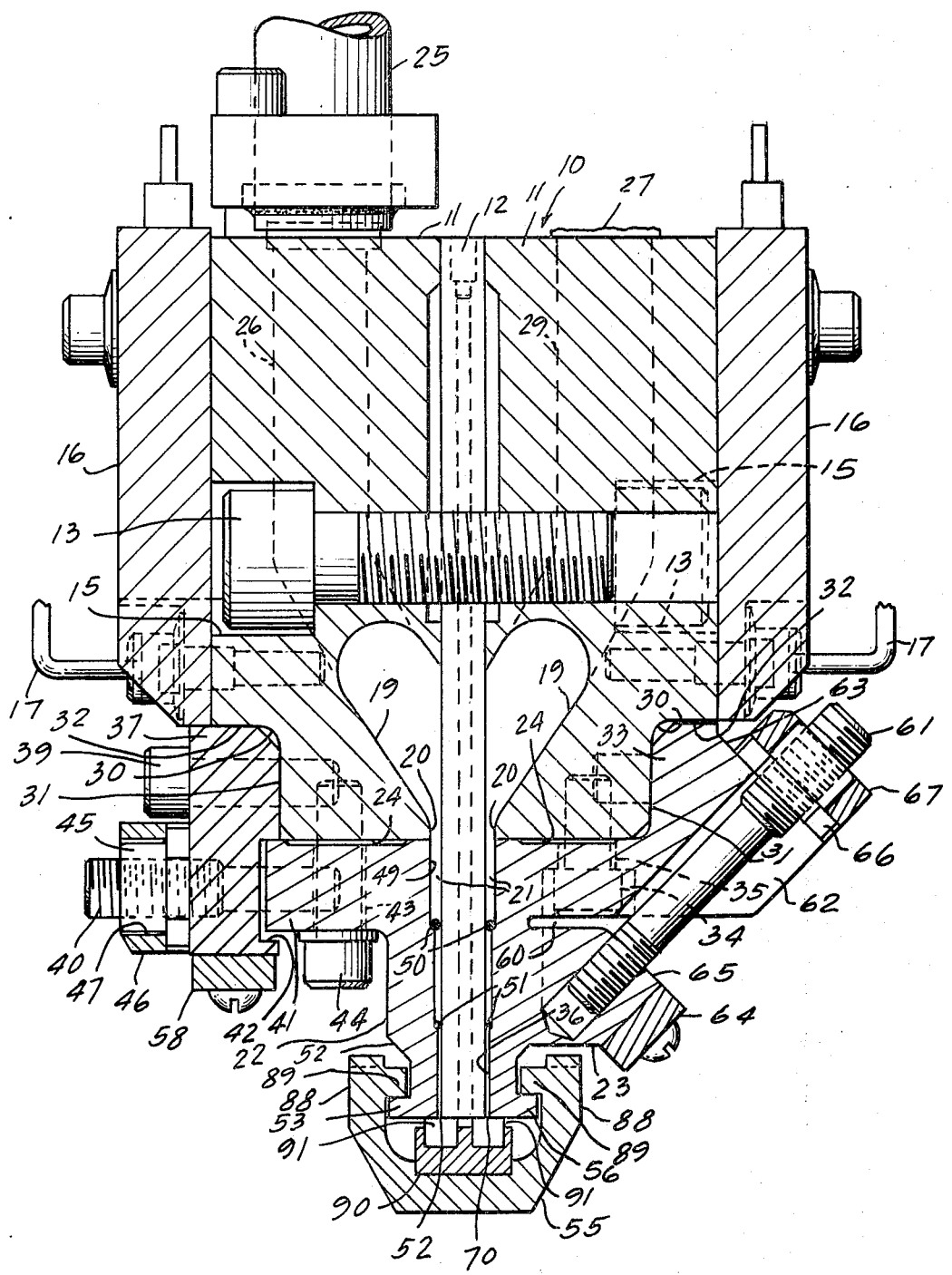
FIG. 2 is a sectional view taken substantially along line II—II of FIG. 1.

The bottom walls 24 of each die half terminate at their outer ends into a shouldered recess 30 formed by vertical walls 31 leading upwardly from a bottom wall 24 and terminating into a horizontal wall 32 extending outwardly to the side wall of the die half. The shouldered recess 30 forms a recess for an upright abutment wall 33 for the die lip 23, to limit inner movement thereof and locate an inner wall 36 of said die lip relative to the divider 12. With an inner wall 36 of said die lip in direct alignment with the outer wall of the passageway 20, a series of machine screws 34 equally spaced along the die lip and extending through a slotted hole 35 and threaded in holes opening through the bottom 24 of the die half, may secure the die lip to said die half, said screws may be between the adjusting means for the die lips, to afford access thereto from the bottom of the die.

Where two different forms of die lips are used, as shown in FIGS. 2 and 3, the shouldered portion of the die half 11 opposite the die lip 23 may form a recess for a mounting bar 37 for adjustment screws 40 for the die lip 22. The mounting bar 37 is mounted in the shouldered recess 30 as by cap screws 39 and depends therefrom. Said mounting bar has a plurality of equally spaced threaded holes, spaced therealong for screws 40 herein shown as being differential screws and threaded in a horizontal flange 41 for the die lip 22, abutting the bottom of the die half, and shown as being slidably recessed in a rectangular recess 42 in the mounting bar 37 and opening to the inside thereof. The flanged portion of the die lip 22 is provided with a plurality of parallel equally spaced slots 43 extending therealong and registrable with threaded holes spaced along the die half 11 and opening through the bottom thereof. Machine or cap screws 44 extending through said slots are threaded in said threaded holes to retain the die lip in position and accommodate adjustable movement thereof toward and from the divider 12. The differential screws 40 are shown as socket head screws and each have a T-head nut 45, threaded thereon the large diameter portion of which nut is a hex head and abuts the other side of the mounting bar 37. The screw may adjust the position of the die lip 22 by turning movement thereof. The nut may also serve as an adjustment means, and an abutment member for the screw and is held to said screw as by a nut retainer bar 46 extending for the length of the mounting bar 37 and having holes 47 fitting along the small diameter portion of the nut 45. The nut retainer 46 is adapted to be retained to the mounting bar 37 as by cap screws 48 spaced therealong, as shown in FIG. 1.

An inner wall 49 of the die lip 22 is stepped to provide a series of vertically spaced lands along which slidably fit internal deckles 50 and 51 determining the width of the film and reducing beading of the edge of the film. While two internal deckles are shown on each side of the divider plate 12, more than two may be provided if desired or required for certain conditions and types of die lips.

The lower end portion of the inner wall 49 cooperating with a wall of the divider 12 forms an orifice 52 for the extrusion of the plastic material therefrom.

A strip heater 58 is shown as extending along the bottom of the mounting bar 37, to aid in equalizing the temperature of the melt. Said heater may be a conventional form of resistor heater.

The die lip 22 has a recessed portion extending therealong, the lower margin of which forms a gib 53, forming a slidable support for one side of a deckle boat 55. The opposite die lip 23 has a similar recessed portion and gib 56 forming a support for the opposite side of the deckle boat 55 as clearly shown in FIGS. 2 and 3.

The die lip 23 is shown as a lip of the type termed a "flex die lip", the interior wall of which is stepped to form vertically spaced lands for internal deckles 50 and 51, slidably guided along said lands to determine the width of the film and substantially eliminate beading along the edges thereof.

The flex die lip 23 has a slotted portion 60 extending inwardly therealong in a plane parallel to the plane of the bottom wall of the die half 11 and accommodating flexing of the die lip toward and from the divider 12 under the control of a differential screw 61 similar to the differential screw 40.

The abutment 33 engaging the shouldered portion 30 of the die half 11 extends outwardly and downwardly from the horizontal wall 32 in an angular path and has an outwardly opening slot 62 extending therealong to the slot 60 and perpendicular to the angle of the abutment surface 63, along which extends the differential screw 61. The differential screw 61 is threaded at its lower end in a lug 65 extending at the angle of the abutment surface 63 and spaced downwardly therefrom on the opposite side of the slot 60 from said abutment surface 63. A strip heater 64 of the resistor type extends tends along the end of the lug 65, to maintain the die lip at the proper temperature. The enlarged diameter end of the differential screw 61 has a T-nut 66 threaded thereon retained to the abutment surface 63 as by a retainer bar 67, in the same manner the T-nut 45 is retained to the retainer bar 37. The differential screw 61 may be a socket heat screw, turnable by a wrench to effect flexing of the lip of the die lip 23, in an obvious manner. Adjustment of the length of the screw and flexing of the lip may also be attained by turning of the T-nut 66. The lower end of the die lip 23 forms an orifice 70 like the orifice 52, which may be varied by flexing of said lip.

The die lips 22 and 23 are interchangeable and may be on either side of the die, or the same lips 22 or 23 may be on each side of the die to give optimum results for the particular type of plastic material extruded.

In FIG. 4 a form of slide lip 71 is shown, which may be used in place of the lips 22 or 23, and in which the lip portion itself has an upwardly facing inclined bearing surface 72 slidably engaging a corresponding downwardly facing bearing surface 73 of a lip support 75. The inclined bearing surface 72 is so spaced relative to the bottom wall 24 of the die half 11 that said bearing surface may form a land 76 for an internal deckle (not shown) and cooperating with another internal deckle (not shown) for an upwardly spaced land 77, to determine the edge and width of the film and to reduce beading of the edge thereof. The slide lip 71 has an internal wall 79 cooperating with the facing wall of the divider 12 to form an orifice 80, the width of which may be varied in accordance with the position of said slide lip along the lip support 75. Like the slide lips 22 and 23, adjustement of the lip 71 is attained by a differential screw and T-nut 81, threaded in said slide lip and extending along an outwardly facing slotted portion 82 of the lip support 75 and a T-nut 84 abutting the top surface of the lip support 75.

The lip support 75 has an upright portion 83 fitting within the recess 30 of the die half and secured thereto as by machine screws 85 threaded within the die half 11 through the same threaded holes that are used to retain the mounting bar 37 to the die half, when using a slide lip of the type shown in FIG. 3. The threaded holes are provided in each die half and extend through the vertical walls 31 thereof and are in horizontal alignment with each other. The machine screws 85 may be socket head screws and the heads thereof fit within recessed portions (not shown) between the slotted portions 82 of the lip support 75, to accommodate the lip support 75 to be placed on either side of the die body and to be interchanged with the die lips 22 or 23. Cap screws may also be threaded in the bottom opening holes in the bottom of the die half when the die lip 71 is removed.

Figure 5:
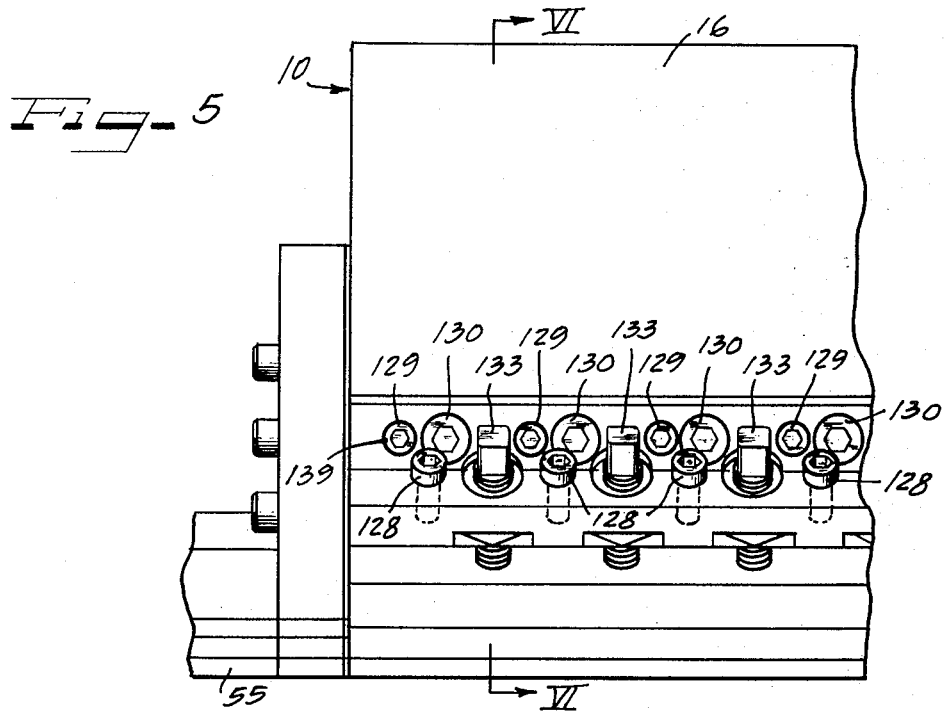
FIG. 5 is a fragmentary side elevational view of a portion of the modified form of extrusion die from that shown in FIG. 1.
Figure 6:
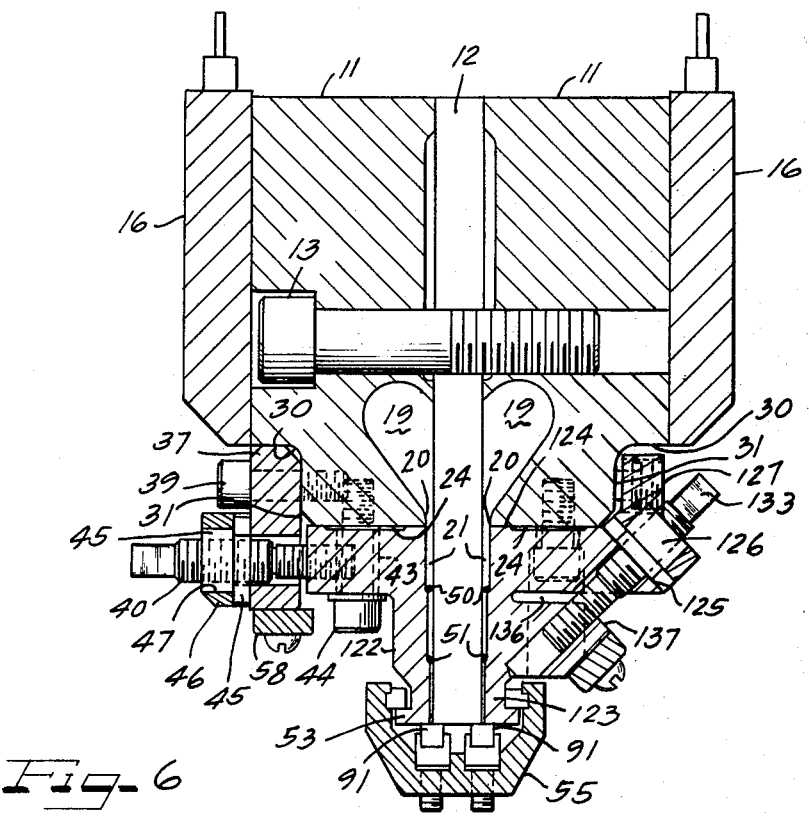
FIG. 6 is a sectional view of the die shown in FIG. 5, taken substantially along line VI—VI of FIG. 5.

In FIGS. 5 and 6 of the drawings, I have shown a die and die lip structure somewhat similar to those shown in FIGS. 1 and 2, having a slide lip 122 on one side of the divider plate 12, and a flex-lip 123, on the oppostie side of said divider plate, in which the entire flex-lip package may be flexed in addition to being slidably adjustable relative to the divider plate 12.

In this form of the invention, the slide lip 122 is similar to the slide lip 22 and is mounted on its die half in the same manner the slide lip 22 is mounted on its die half so a description thereof need not be repeated herein and the same part numbers will be applied to the slide lip 122 as were applied to the same parts of the slide lip 22.

As shown in FIG. 6 of the drawings, the flex lip 123 has an inner stepped wall spaced from the center divider 12 and forming spaced lands for internal deckles 50 and 51, eliminating beading along the edge of the film and cooperating with the internal deckles extending along the spaced lands of the slide lip 122 and external deckle seals 91, 91 to determine the width of the film. While I have herein shown four internal deckles for each end of the die, it should be understood two additional deckles may be provided at each end of the die at the junctures of the manifold chambers 19 with the melt flow passageways 20, further interrupt the edge of the molten plastic and eliminate or minimize edge bead.

The flex lip 123 has a body portion having an upper face 124 engaging the bottom surface 24 of a die half 11 and having an inclined wall 125 extending angularly downwardly and outwardly from the outer end of the face 24 and forming an abutment for T-nuts 126 spaced along said inclined wall. The inclined wall 125 together with the vertical wall 31 of the recess 30 cooperate with similar walls of a mounting bar 127 holding the T-nut 126 from rotation and from axial movement, and also slidably moving the flex lip in and out upon adjustable movement of push screws 129 and pull screws 130 spaced along the die for substantially the length thereof. The mounting bar 127 has a lower portion conforming to the plane of the inclined wall 125 and is retained to said wall by a plurality of socket head screws 128 spaced along the mounting bar on opposite sides of differential adjustment screws 133. The T-nuts may be turned upon loosening said socket head screws 128.

The differential screws 133 are threaded in the T-nuts 126, abutting the inclined wall 125 extending angularly downwardly and outwardly from the surface 124 of the flex lip 123, which T-nuts are held from axial movement by the wall 125 and the inclined lower end portion of the mounting bar 127.

As in the form of the invention shown in FIG. 2, a slot 136 extends horizontally inwardly along the flex 123 and forms an inward continuation of the outer bottom surface of the abutment surface 125. A lug 137 extends angularly outwardly and downwardly of the bottom wall of the slot 136 in parallel relation with respect to the abutment surface 125 and is drilled and threaded at the angle of the axis of the differential screw 133 and has the small diameter end of the differential screw 133 threaded therein to flex the die lip relative to the slot 136 and thereby open and close said slot, and relative to the divider plate 12 to vary the width of the orifice between said flex lip and divider plate. The differential screws 133 are shown as being provided with square heads for turning by a crank or wrench and the like.

The push screws 129 have socket heads 139 which may be threaded in the vertically extending portion of the retainer bar 127 with right-hand threads and push against the surface 31 of the die half 11 as turned in a clockwise direction and thereby bodily push ht flex lip 123 outwardly relative to the divider plate 12. The push screws, of course, could have left-handed threaded and push the mounting bar outwardly as turned in a counterclockwise direction.

The pull screws 130 extend through the retainer bar 127 adjacent the push screws and are threaded in the die half and have socket heads 141 bearing against the vertical face of said retainer bar 127, and serve to pull the flex lip 123 inwardly relative to the divider plate 12 to vary the spacing between said flex lip and divider plate, and in cooperation with the push screws 129 and differential screws 133 provide an accurate spacing between said flex lip and divider plate, said differential screws 133 serving to flex the lip inwardly or outwardly as required for optimum performance for certain theremoplastic materials.

The die lips 122 and 123 slidably support a deckle boat 55 as in the form of the invention shown in FIGS. 1, 2 and 3 and carrying deckle seals 91 varying the width of the orifices 52 and 70 in accordance with the width of the sheets extruded through said orifices will hereinafter more clearly appear as this specification proceeds.

In the present disclosure, I have shown four forms of die lips and mounting arrangements therefor which may be interchangeably mounted on the die halves 11 in various conceivable arrangements and combinations, on either side thereof, to accommodate the lips and orifices defined thereby to give optimum results for the particular types of thermoplastic material extruded. It should, however, be understood that various other forms of die lips may be designed and utilized on the die halves 11, to provide a lip package in which the lips cooperate with the mounting holes on the die halves to provide almost any conceivable die lip design without altering the design of the die halves.

Referring now in particular to the deckle 55 and the means for adjusting the deckle along the die to determine the edge of the film and reduce beading thereof, it is understood that each end of the die block 10 is the same and that the deckles 55 are supported and guided on the die lips at each end of the die block in the same manner, and may be adjustably moved inwardly or outwardly relative to the die block to determine the edge of the film. The deckle on one end of the die block, therefore, need only be shown and described in detail herein.

The deckle 55 is of a boat-like shape in cross section having upright walls 88 having gibs 89 extending inwardly therefrom and slidably supported on the gibs 53 and 56 of the respective die lips 22 and 23. The deckle 55 has a deckle bar 90 partially recessed therein and extending therealong having deckle seals 91 recessed in said deckle bar and extending upwardly therefrom into sealing engagement with the respective orifices 52 and 70, shown in FIG. 2.

The parallel walls 88 of the deckle boat 55 are shown as having rack teeth 93 cut in the top surfaces thereof, meshed with pinions 95 on a transverse shaft 96. The pinions 95 are shown in FIG. 3 as having tubes 97, which may be squared and pinned to said shaft to receive a socket wrench (not shown) for turning said pinions and adjustably moving the deckle boat 55 and seals 91 in an obvious manner. The shaft 96 is journalled intermediate its ends in a block 99 extending outwardly of an end plate 100 for the die block 10 and suitably secured thereto. Cap screws 101 may sealingly engage said end plate with the end of said die block. The vertical walls of the deckle boat 55 extend beyond the rack teeth 93 and have a bracket 103 secured thereto and extending thereacross and forming an adjustment means for the four internal deckles 50, 50 and 51, 51 as shown in FIGS. 2 and 3.

As shown in FIG. 1, seals 104 for the internal deckles extend within the mounting block 99 and accommodate slidable movement of said deckles relative to said seals and cooperate with said mounting block and end plate to seal the melt flow passageways of the mold. Sleeves 105 may be held from axial movement relative to the block 103 and may be internally threaded and have collets 106 threaded thereon. The collets 106 may grippingly engage the respective internal deckles and adjustably move the internal deckles together by manual movement of the block 103. Said collets may also be released from the internal deckles to release the deckles to be moved relative to each other upon turning movement of said sleeves 105 relative to said collets. The collets 106 may be of a conventional form and are only diagrammatically shown herein since they form no part of the present invention except insofar as they form a means for clampingly engaging the deckles 50 and 51 for adjustably moving the deckles or for releasing said deckles to accommodate said deckles 50 and 51 to be manually pushed in and out as required.

The external deckle boat 55 and deckle seals 91 carried thereby sealing the orifices 52 and 70, may be adjustably moved by a wrench or hand crank and the like. The upper internal deckles 50 may be offset relative to the lower internal deckles 51 or vice versa to disrupt the edge of the molten plastic as an aid to avoiding beading of the edges of the film, while the boat deckle and deckle seals 91 may determine the width of the film as leaving the orifices and further reduce edge build up in the extruded layers. The internal deckles 50 and 51, while shown as being round, may be half round, pointed or of various other shapes best suited for disruption of the edge bead of the molten plastic for at least part of their length. While only four internal deckles are shown herein it should be understood that additional deckles (not shown) may be provided at the mouths of the melt flow passageways 20, where required for certain molten plastic materials and film forming conditions.

The multiple internal deckles shown may be adjustably moved relative to each other or together, and to the deckle seals 91 and cooperate therewith to provide accurate deckle width control, prevent leaks from the ends of the die body and orifices, reduce edge beading by disrupting the edge of the plastic and thereby improve layer caliber and quality at the edges, in cooperation with the die lips providing the proper outlet orifices for optimum performance of a particular form of thermoplastic material used.

It should be understood that while I have shown a rack and pinion for adjustably moving the deckle boat along the die lips, that a rack and pinion need not necessarily be used and the pinion teeth 93 may be worm teeth as well and the deckle boat can be adjustably moved by one or more worms and worm gears in which the teeth are so formed as to be self-locking.

I claim as my invention:
1. In a film extrusion die,
an elongated die body,
at least one inlet leading into said die body,
a manifold chamber in communication with said inlet,
a melt flow passage leading from said manifold chamber,
an orifice forming a continuation of said melt flow passageway,
a pair of laterally spaced die lips defining said orifice, each die lip having an internal wall having at least two lands thereon spaced vertically of said orifice, at least two parallel spaced internal deckles guided in each end of said die body for adjustable movement relative to each other along said lands and defining the edge of the film, an external deckle at each end of said die body having sealing engagement with said orifice, means on said die lips supporting said external deckles for slidable movement therealong, adjustment means for moving said external deckles along said die lips to define the width of the film, and means accommodating independent adjustable movement of said internal deckles relative to each other and relative to said external deckles comprising releasable holding means holding said internal deckles for movement together and releasable to enable said internal deckles to be moved relative to each other.

2. The film extrusion die of claim 1,
wherein the means selectively operable to move said internal deckles together and to accommodate independent movement of said deckles relative to each other comprises a guide member extending from said external deckle, and forming a guide for said internal deckles guiding said internal deckles for independent adjustable movement relative to said external deckle.

3. The film extrusion die of claim 2, wherein the folding means comprises an individual collet for each internal deckle carried by said guide member and operable to clampingly engage selective of said internal deckles for movement with said external deckle.

4. The film extrusion die of claim 2, wherein the means for adjustably moving said external deckles comprises gear means having driving connection to said external deckles.

5. The film extrusion die of claim 1, wherein at least one of said die lips is adjustably movable relative to said melt flow passageway to vary the width of said passageway and orifice.

6. In a multi-layer film forming die,
an elongated split die body comprising,
two die halves,
a divider separating said halves,
an inlet leading into each half,
a manifold chamber in each half in communication with an associated inlet,
a melt flow passageway leading from each manifold chamber,
said divider defining one wall of each manifold chamber and melt flow passageway,
an orifice leading along each side of said divider and forming continuations of said melt flow passageways,
a pair of die lips defining the outer walls of said orifices,
means mounting said die lips on said halves of said die body for interchangeability with respect to each other,
other means adjustably moving said die lips relative to said divider wall,
the means mounting said die lips on said die body accommodating ready removal and interchangeability of said die lips in accordance with orifice requirements to attain optimum performance of said orifices for particular film layers formed.

7. The multi-layer film forming die of claim 6,
wherein one die lip is a flexing die lip and means are provided for flexing said lip and holding said lip in position,
wherein the other die lip is a slidably adjustable die lip having a rigid lip portion,
wherein bolt holes are spaced along said die body to accommodate bolting of said die lips to said die body, and
wherein registering bolt holes are provided in said die lips and the relationship between said bolt holes in said die lips and said die body is such as to accommodate the interchangeability of said flexible die lip for said slidable die lip on either die half and the substitution of one type of die lip for the other to provide the same types of die lips on each die half.

8. The multi-layer forming die of claim 7,
wherein one die lip is a slidably adjustable die lip having a rigid lip portion,
wherein the other die lip is a slidably adjustable die lip having a rigid lip portion and adjustable along an inclined plane inclined downwardly toward said orifice,
wherein bolt holes are spaced along said die halves to accommodate bolting of said die lips to said die halves,
wherein registering bolt holes are provided in said die lips, and
wherein the relationship between said bolt holes on both of said die lips with respect to said bolt holes in said die body is such as to accommodate the interchanging of said die lips on either side of said die body.

9. The multi-layer film forming die of claim 7,
wherein each half of said die body has a bottom wall, a side wall facing perpendicularly thereto and having a shouldered portion joining said bottom wall with said side wall,
wherein spaced bolt holes are provided in said bottom wall at equal intervals along said die halves, and
wherein said die lips abut said bottom wall and have bolt holes registrable with the bolt holes in said bottom wall regardless of the side of said die body on which said die lips are mounted, and the configuration of said die body is such as to accommodate the use of a wide variety of die lips on either side of said die body without altering said die lips or said die body.

10. The multi-layer film forming die of claim 8, wherein one of said die lips is a flexing die lip and includes an inner wall having a pair of parallel spaced lands therein cooperating with said divider and also having a slotted portion parallel to the end wall of said die half, and an angularly extending lug defining one end of said slotted portion, an abutment face spaced from and parallel to said lug, and screw means threaded in said lug and abutting said abutment face and operable to react thereagainst and flex said die lip to vary the width of the orifice defined between said die lip and divider.

11. The multi-layer film forming die of claim 10, wherein said screw means are spaced along said die lip for the length thereof, and wherein a retainer bar for said screw means is provided to retain all of said screw means in position and said die lips in a preselected position relative to said divider.

12. The multi-layer film forming die of claim 10,
wherein at least one of said die lips is slidable towards and from said divider along an inclined plane,
wherein a lip support forms a support for said lip and has surfaces conforming to said end wall and shoulder, and has at least one internal land and a downwardly facing inclined wall portion forming a slidable guide for said lip, and
wherein screw means are provided for moving said lip along said inclined wall portion and holding said lip in position relative thereto.

13. The multi-layer film forming die of claim 8,
wherein one of said lips is a slide lip slidably movable along said end wall and having an inner wall facing said divider and having a pair of parallel lands spaced therealong,
wherein a mounting bar extends along at least one die half in engagement with said shouldered portion of said end wall and extends outwardly and downwardly therefrom, and
wherein screw means threaded in said mounting bar and said slide lip are provided to move said slide lip relative to said divider to adjust the orifice to a preselected width.

14. The multi-layer film forming die of claim 6,
wherein the die lips each have outwardly opening recessed portions extending therealong terminating at their lower ends in gibs,
wherein an external deckle is slidably supported on said gibs and has seals extending therealong having sealing engagement with said orifices,
wherein said die lips each have an inner wall, and at least two parallel spaced lands extending along said wall,
wherein internal deckles extend within said die lips along said lands and have sealing engagement with said die halves,
wherein means are provided for adjustably moving said external deckle along said gibs, and
wherein other means are provided to adjustably move said internal deckles with said external deckle and to accommodate independent adjustable movement of said internal deckles relative to each other and relative to said external deckle.

15. The multi-layer film forming die of claim 14, wherein gear means are provided for adjustably moving said external deckle along said die lips, and releasable clamping means are provided to releasably clamp said internal deckles for adjustable movement with said external deckle, and to accommodate independent movement of said internal deckles relative to each other.

16. In a die lip and in combination with a die for the extrusion of film and having a bottom wall and an outwardly facing vertical wall, said die lip having a body portion having an upper face engageable with a bottom surface of said die,
an inner wall portion defining a wall of a hot flow passageway, and
a lip portion forming a continuation of said wall portion and defining the lip of an extrusion orifice,
threaded means detachably securing said die lip to said die body and accommodating interchangeability of one die lip for another, and also accommodating adjustment of said body portion and die lip along said bottom wall to vary the width of the hot flow passageway, and
alternately arranged push and pull screws for adjustably moving said die lip along said bottom wall in accordance with the width of the flow passageway required for optimum results for a particular thermoplastic material to be extruded.

17. The die lip of claim 16,
wherein the body portion of said die lip has an outwardly opening horizontally extending slot extending therealong, and
wherein differential screw means are operable to flex said die lip portion about said slot.

18. The die lip of claim 16,
wherein a mounting bar extends along said outwardly facing vertical wall and therebeneath and forms a reaction member for said alternately arranged push and pull screws,
wherein means are provided for detachably mounting said mounting bar to an associated die lip, and
wherein mounting bars are interchangeably mounted on said die, to accommodate the interchangeability of die lips on die, by the interchangeability of said mounting bars for various types of die lips in accordance with orifice requirements for optimum results for the extrusion of a particular thermoplastic material.

19. The die lip of claim 18, wherein the mounting bar forms a reaction member for said alternately arranged push and pull screws, and has an outwardly inclined abutment portion forming a reaction member for said screw means for flexing said die lip, and a second mounting bar forms a reaction member for moving a slide die lip inwardly and outwardly to determine the width of the extrusion orifice.

* * * * *